US012676342B2

(12) United States Patent
Yu et al.

(10) Patent No.: US 12,676,342 B2
(45) Date of Patent: Jul. 7, 2026

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Sung Hoon Yu, Daejeon (KR); Kyung Mi Lee, Daejeon (KR); Shul Kee Kim, Daejeon (KR); Hyun Yeong Lee, Daejeon (KR); Yoo Sun Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 263 days.

(21) Appl. No.: 16/078,290

(22) PCT Filed: Jan. 18, 2018

(86) PCT No.: PCT/KR2018/000872
§ 371 (c)(1),
(2) Date: Aug. 21, 2018

(87) PCT Pub. No.: WO2018/139808
PCT Pub. Date: Aug. 2, 2018

(65) Prior Publication Data

US 2019/0341654 A1 Nov. 7, 2019

(30) Foreign Application Priority Data

Jan. 26, 2017 (KR) ........................ 10-2017-0012711
Jan. 17, 2018 (KR) ........................ 10-2018-0006124

(51) Int. Cl.
*H01M 10/0567* (2010.01)
*C07F 7/04* (2006.01)
(Continued)

(52) U.S. Cl.
CPC ........... *H01M 10/0567* (2013.01); *C07F 7/04* (2013.01); *C07F 9/535* (2013.01); *H01M 4/587* (2013.01);
(Continued)

(58) Field of Classification Search
CPC .................... H01M 10/05–0569; H01M 4/583
See application file for complete search history.

(56) References Cited

U.S. PATENT DOCUMENTS

2003/0003358 A1 1/2003 Mandal et al.
2010/0248036 A1 9/2010 Okumurai et al.
(Continued)

FOREIGN PATENT DOCUMENTS

CN 102165628 A 8/2011
CN 103367803 A 10/2013
(Continued)

OTHER PUBLICATIONS

KR-20150022649-A English Machine Translation (Year: 2020).*
(Continued)

*Primary Examiner* — Armindo Carvalho, Jr.
(74) *Attorney, Agent, or Firm* — Lerner David LLP

(57) ABSTRACT

The present invention relates to a non-aqueous electrolyte solution for a lithium secondary battery which includes a compound acting as a HF scavenger, and a lithium secondary battery in which cycle life characteristics and high-temperature storage characteristics are improved by including the same.

11 Claims, 1 Drawing Sheet

(51) Int. Cl.

| | |
|---|---|
| ***C07F 9/535*** | (2006.01) |
| ***H01M 4/02*** | (2006.01) |
| ***H01M 4/587*** | (2010.01) |
| ***H01M 10/0525*** | (2010.01) |

(52) U.S. Cl.

CPC .. *H01M 10/0525* (2013.01); *H01M 2004/027* (2013.01); *H01M 2300/0025* (2013.01)

(56) References Cited

U.S. PATENT DOCUMENTS

| | | | | |
|---|---|---|---|---|
| 2011/0086269 | A1 | 4/2011 | Yamaguchi et al. | |
| 2011/0165457 | A1 | 7/2011 | Prochazka, Jr. et al. | |
| 2011/0206997 | A1 | 8/2011 | Kim et al. | |
| 2013/0011728 | A1* | 1/2013 | Tokuda | H01M 10/0567 429/200 |
| 2013/0052543 | A1* | 2/2013 | Ihara | H01M 10/0568 429/207 |
| 2015/0079484 | A1* | 3/2015 | Cresce | H01M 10/0525 429/339 |
| 2015/0188126 | A1 | 7/2015 | Kang et al. | |
| 2015/0249267 | A1* | 9/2015 | Yoon | H01M 10/052 429/332 |
| 2016/0028084 | A1* | 1/2016 | Lee | C01B 33/113 216/13 |
| 2016/0141717 | A1 | 5/2016 | Lee et al. | |
| 2016/0172681 | A1 | 6/2016 | Yang et al. | |
| 2016/0172711 | A1 | 6/2016 | Yang et al. | |
| 2016/0211507 | A1* | 7/2016 | Sharma | H01M 4/0402 |
| 2016/0351956 | A1 | 12/2016 | Lee et al. | |
| 2019/0221889 | A1* | 7/2019 | Chiga | H01M 4/525 |

FOREIGN PATENT DOCUMENTS

| | | | | |
|---|---|---|---|---|
| CN | 103427116 | A | | 12/2013 |
| CN | 104241614 | A | | 12/2014 |
| CN | 104425841 | A | | 3/2015 |
| DE | 102015102090 | A1 | | 6/2016 |
| EP | 2816639 | A2 | | 12/2014 |
| JP | 2001283904 | A | | 10/2001 |
| KR | 101083882 | B1 | | 11/2011 |
| KR | 20140036535 | A | | 3/2014 |
| KR | 20150022649 | A | * | 3/2015 |
| KR | 20150069459 | A | | 6/2015 |
| KR | 20160140211 | A | | 12/2016 |

OTHER PUBLICATIONS

International Search Report for Application No. PCT/KR2018/000872 dated Apr. 25, 2018.

Partial Supplementary European Search Report including Written Opinion for Application No. EP18745439.2 dated Jan. 7, 2019.

Extended European Search Report including Written Opinion for Application No. EP18745439.2 dated Apr. 25, 2019.

J. S. Gnanaraj et al: "LiPF3(CF2CF3)3: A Salt for Rechargeable Lithium Ion Batteries", Journal of the Electrochemical Society, vol. 150, No. 4, Feb. 28, 2003, p. A445, XP055580340.

M. Schmidt et al: "Lithium fluoroalkylphosphates: a new class of conducting salts for electrolytes for high energy lithium-ion batteries", Journal of Power Sources, vol. 97, Dec. 30, 2000, pp. 557-560, XP028142859.

Chinese Search Report for Application No. 201880001258.X, dated Oct. 27, 2020, pp. 1-3.

Yanagisawa, et al., Effects of organic silicon compounds as additives on charge-discharge cycling efficiencies of lithium in nonaqueous electrolytes for rechargeable lithium cells, Journal of Power Sources, available online May 2014, pp. 232-240, vol. 266.

* cited by examiner

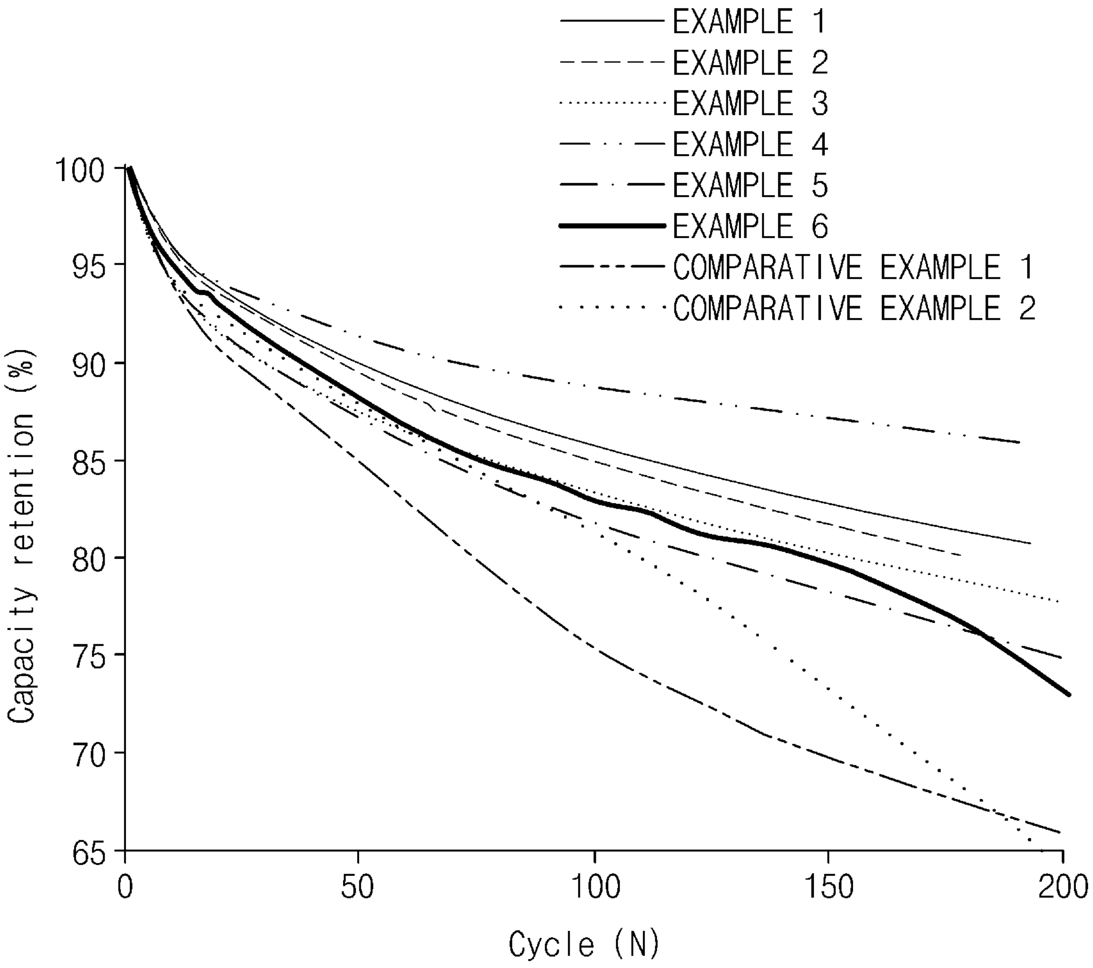
EXAMPLE 1
EXAMPLE 2
EXAMPLE 3
EXAMPLE 4
EXAMPLE 5
EXAMPLE 6
COMPARATIVE EXAMPLE 1
COMPARATIVE EXAMPLE 2
Capacity retention (%)
100
95
90
85
80
75
70
65
0
50
100
150
200
Cycle (N)

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/000872, filed Jan. 18, 2018, which claims priority from Korean Patent Application Nos. 10-2017-0012711 filed on Jan. 26, 2017, and 10-2018-0006124 filed on Jan. 17, 2018, in the Korean Intellectual Property Office, the disclosures of which are incorporated herein by reference.

TECHNICAL FIELD

The present invention relates to a non-aqueous electrolyte solution for a lithium secondary battery having improved cycle life characteristics and high-temperature storage characteristics and a lithium secondary battery including the same.

BACKGROUND ART

In line with miniaturization, lightweight, thin profile, and portable trends in electronic devices according to the recent development of information and telecommunications industry, the need for high energy density batteries used as power sources of such electronic devices has increased. Lithium secondary batteries, specifically, lithium ion batteries (LIB), as batteries that may best meet the need, have been adopted as power sources of many portable devices due to high energy density and ease of design.

Recently, research on lithium secondary batteries, which may maintain excellent performance not only at room temperature but also in a more severe outside environment such as a high-temperature or low-temperature environment, has expanded as the lithium ion batteries has been adopted as power sources for electric vehicles or electric power storage in addition to small electronic devices such as portable IT devices.

A lithium secondary battery currently used is composed of a carbon material negative electrode capable of intercalating and deintercalating lithium ions, a positive electrode formed of a lithium-containing transition metal oxide, and an electrolyte.

There are various types of non-aqueous solvents used in the electrolyte for a lithium secondary battery, but, in terms of safety improvement, it is desirable to use a high boiling point solvent, for example, cyclic carbonate, such as ethylene carbonate (EC), propylene carbonate (PC), or fluoroethylene carbonate (FEC).

In a case in which the lithium secondary battery is used under a high voltage, the following problems may occur.

These include: first, capacity degradation caused by repeated mechanical stress due to changes in the structure of a negative electrode active material according to charging and discharging in a high voltage range, and, second, capacity degradation caused by the formation of a non-conducting solid electrolyte interface (SEI) and the dissolution of metal ions due to an electrolyte solution side reaction according to the use of high voltage.

One of the causes of the electrolyte solution side reaction is a small amount of moisture in the electrolyte solution which is generated in a battery manufacturing process. The residual moisture reacts with $LiPF_6$, as a lithium salt, to form HF, a strong acid, and the HF may cause problems in safety, for example, the HF is decomposed during charge and discharge to release hydrogen gas, or degrades the surface of the positive electrode to dissolve metal ions. In the degradation phenomenon, the precipitation of lithium (Li) metal is intensified as the charge and discharge are repeated.

Thus, a method of reducing the formation of HF by removing moisture through heating in the manufacturing process has been proposed, but it is very difficult to completely remove the moisture that is adsorbed on an active material or the like.

Therefore, there is a need to develop a secondary battery in which the capacity degradation may be improved by removing the HF formed by the side reaction of the electrolyte solution.

PRIOR ART DOCUMENT

Korean Patent No. 1083882

DISCLOSURE OF THE INVENTION

Technical Problem

An aspect of the present invention provides a non-aqueous electrolyte solution for a lithium secondary battery which includes a compound acting as a HF scavenger as an additive.

Another aspect of the present invention provides a lithium secondary battery in which cycle life characteristics and high-temperature storage performance are improved by including the non-aqueous electrolyte solution for a lithium secondary battery.

Technical Solution

According to an aspect of the present invention, there is provided a non-aqueous electrolyte solution for a lithium secondary battery including:

a lithium salt, a first organic solvent, fluoroethylene carbonate, and at least one compound selected from the group consisting of compounds represented by Formulae 1 and 2 as a first additive.

[Formula 1]

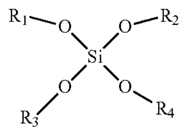

In Formula 1, $R_1$ to $R_4$ are each independently a fluorine-substituted or unsubstituted alkyl group having 1 to 4 carbon atoms.

[Formula 2]

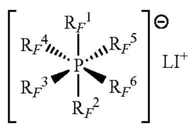

In Formula 2, $R_F^1$ to $R_F^6$ are each independently a fluorine atom, or a fluorine-substituted or unsubstituted alkyl group having 1 to 3 carbon atoms, wherein $R_F^1$ to $R_F^6$ are not fluorine atoms at the same time.

In the non-aqueous electrolyte solution of the present invention, the fluoroethylene carbonate may be included in an amount of 0.1 wt % to 40 wt %, particularly 0.1 wt % to 30 wt %, and more particularly 5 wt % to 20 wt % based on a total weight of the non-aqueous electrolyte solution.

Also, in the non-aqueous electrolyte solution of the present invention, the compound represented by Formula 1 may include at least one selected from the group consisting of compounds represented by Formulae 1a to 1e below.

[Formula 1a]

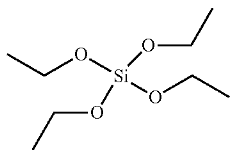

[Formula 1b]

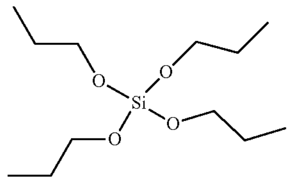

[Formula 1c]

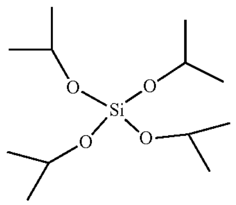

[Formula 1d]

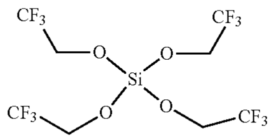

[Formula 1e]

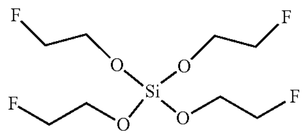

Furthermore, in the compound represented by Formula 2 as one of the first additives of the present invention, $R_F^1$ and $R_F^2$ may each independently be a fluorine-substituted or unsubstituted alkyl group having 1 to 3 carbon atoms, $R_F^3$ may be a fluorine atom or a fluorine-substituted alkyl group having 1 to 3 carbon atoms, and $R_F^4$, $R_F^5$, and $R_F^6$ may each independently be a fluorine atom.

Specifically, in the non-aqueous electrolyte solution of the present invention, the compound represented by Formula 2 may include a compound represented by the following Formula 2a or 2b.

[Formula 2a]

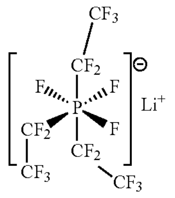

[Formula 2b]

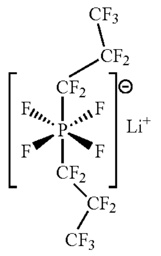

The first additive may be included in an amount of 0.1 wt % to 10 wt %, particularly 1 wt % to 10 wt %, and more particularly 1 wt % to 7 wt % based on the total weight of the non-aqueous electrolyte solution.

According to another aspect of the present invention, there is provided a lithium secondary battery including:

a positive electrode including a positive electrode active material, a negative electrode including a silicon-based negative electrode active material, a separator disposed between the positive electrode and the negative electrode, and the non-aqueous electrolyte solution of the present invention.

In this case, the negative electrode active material may further include a carbon-based negative electrode active material.

Advantageous Effects

In the present invention, a non-aqueous electrolyte solution for a lithium secondary battery, which includes a compound acting as a HF scavenger as an additive, may be provided, and a lithium secondary battery having improved cycle life characteristics and high-temperature storage characteristics may be prepared by using the same.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating the results of cycle life characteristics test according to Experimental Example 1 of the present invention.

MODE FOR CARRYING OUT THE INVENTION

Hereinafter, the present invention will be described in more detail.

It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, provided is a non-aqueous electrolyte solution for a lithium secondary battery including:

a lithium salt, a first organic solvent, fluoroethylene carbonate, and at least one compound selected from the group consisting of compounds represented by Formulae 1 and 2 as a first additive.

[Formula 1]

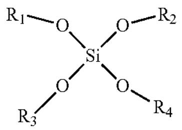

In Formula 1, $R_1$ to $R_4$ are each independently a fluorine-substituted or unsubstituted alkyl group having 1 to 4 carbon atoms.

[Formula 2]

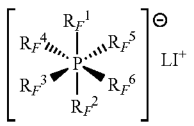

In Formula 2, $R_F^1$ to $R_F^6$ are each independently a fluorine atom, or a fluorine-substituted or unsubstituted alkyl group having 1 to 3 carbon atoms, wherein $R_F^1$ to $R_F^6$ are not fluorine atoms at the same time.

In general, a non-carbon-based negative electrode active material, for example, a silicon (Si)-based negative electrode active material has been widely used to increase battery capacity, and, among various silicon (Si)-based negative electrode active materials, SiO has mainly been used. The SiO is advantageous in that it reduces the expansion of the volume of Si by forming $Li_2O$ while lithium (Li) is intercalated during initial charge (reduction).

However, during charge and discharge of a secondary battery, since a lithium salt, e.g., $LiPF_6$, as an electrolyte salt, is decomposed into LiF and $PF_5$ gas over time and the generated $PF_5$ gas reacts with water to generate HF gas destroying a Si—O bond, the smooth operation of the SiO negative electrode active material is impeded.

Furthermore, with respect to a secondary battery which includes the silicon (Si)-based negative electrode active material and an electrolyte solution including a typical cyclic carbonate-based solvent that does not contain fluorine, since capacity is continuously decreased while the formation of by-products on a surface of a negative electrode is increased and a thick oxygen-rich layer is formed, cycle life characteristics are reduced.

In order to achieve an effect of improving the cycle life characteristics of the secondary battery in which the negative electrode including the silicon (Si)-based negative electrode active material is used, a method of using a fluorine-containing organic solvent, such as fluoroethylene carbonate (FEC), has been proposed.

It is known that the fluoroethylene carbonate compound may increase an amount of reversible Li ions and suppress a reaction between the electrolyte solution and the negative electrode by forming a strong thin LiF-based solid electrolyte interface (SEI) on the surface of the silicon-based negative electrode.

In a case in which the fluoroethylene carbonate is included as an additive or solvent in the non-aqueous electrolyte solution, the solubility of the lithium salt may be increased to improve ionic conductivity of the non-aqueous electrolyte and, simultaneously, a relatively thin layer may be formed on the surface of the negative electrode to improve output characteristics in comparison to a non-aqueous electrolyte solution only including a typical cyclic carbonate-based solvent that does not contain fluorine.

In the non-aqueous electrolyte solution of the present invention, the fluoroethylene carbonate may be included in an amount of 0.1 wt % to 40 wt %, particularly 0.1 wt % to 30 wt %, and more particularly 5 wt % to 20 wt % based on a total weight of the non-aqueous electrolyte solution.

When the fluoroethylene carbonate is included within the above range, an effect of forming a stable SEI on the surface of the silicon-based negative electrode may be obtained. In a case in which the amount of the fluoroethylene carbonate is greater than 40 wt %, viscosity of the non-aqueous electrolyte solution is increased to reduce wetting and gas may be generated during high-temperature storage.

However, since the fluoroethylene carbonate may form a large amount of HF at high temperature, problems occurring in the secondary battery, in which the negative electrode including the silicon (Si)-based negative electrode active material is used, may not be completely improved.

Thus, in the present invention, it has been confirmed that, in a case in which the non-aqueous electrolyte solution includes at least one compound selected from the group consisting of compounds represented by Formulae 1 and 2, HF scavengers, as a first additive with fluoroethylene carbonate, HF generated during the decomposition of the fluoroethylene carbonate may be removed.

That is, since at least one molecule of the compounds represented by Formulae 1 and 2 may consume at least two HF molecules, the release of hydrogen gas caused by the HF or the degradation of a surface of a positive electrode may be significantly improved.

In the non-aqueous electrolyte solution of the present invention, as a representative example, the compound of Formula 1 may include at least one selected from the group consisting of compounds represented by Formulae 1a to 1e below.

[Formula 1a]

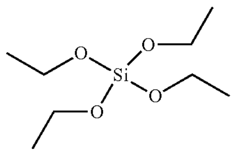

[Formula 1b]

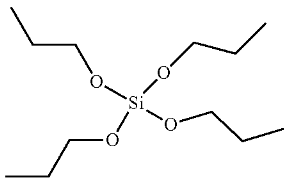

-continued

[Formula 1c]

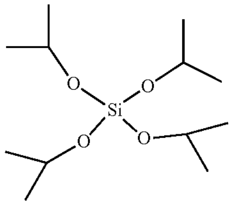

[Formula 1d]

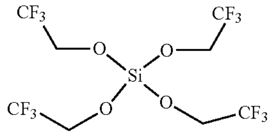

[Formula 1e]

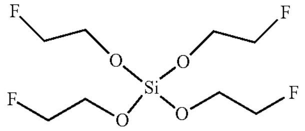

Also, in the compound represented by Formula 2 in the non-aqueous electrolyte solution of the present invention, $R_F^1$ and $R_F^2$ may each independently be a fluorine-substituted or unsubstituted alkyl group having 1 to 3 carbon atoms, $R_F^3$ may be a fluorine atom or a fluorine-substituted alkyl group having 1 to 3 carbon atoms, and $R_F^4$, $R_F^5$, and $R_F^6$ may each independently be a fluorine atom.

As a representative example, the compound of Formula 2 may include a compound represented by the following Formula 2a or 2b.

[Formula 2a]

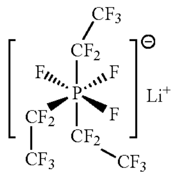

[Formula 2b]

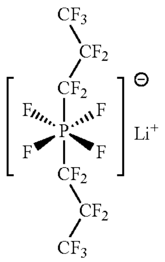

The first additive may be included in an amount of 0.1 wt % to 10 wt %, particularly 1 wt % to 10 wt %, and more particularly 1 wt % to 7 wt % based on the total weight of the electrolyte solution.

If the amount of the first additive is less than 0.1 wt %, a HF scavenger effect is insignificant. Also, since the HF scavenger itself may act as a resistance increasing factor and a by-product of the reaction with moisture may act as a resistance increasing factor, resistance is increased by an excessive amount of the additive when the amount of the first additive is greater than 10 wt %, and thus, electrochemical performance of the secondary battery may be degraded.

As described above, the moisture present in the secondary battery reacts with the electrolyte solution to form acid products (HF, $POF_3$), and it is known that the acid product, for example, HF is a factor that causes a continuous side reaction such as the dissolution of the positive electrode active material and the release of hydrogen gas. Particularly, various Si—O bonds are present in the negative electrode including Si, wherein, if these bonds are destroyed by HF, performance of the battery may only be significantly degraded.

In the present invention, since the non-aqueous electrolyte solution including the HF scavenger, such as the compounds represented by Formulae 1 and 2, which may remove HF or water ($H_2O$), is provided, these problems may be solved.

That is, the compound of Formula 1 included in the non-aqueous electrolyte solution of the present invention contains functional groups, such as a Si—O group and an isocyanate group, capable of removing HF in the structure. Thus, since the Si—O bond of the compound represented by Formula 1 breaks during high-temperature storage to be easily bonded to HF or water ($H_2O$) in the non-aqueous electrolyte solution, the HF or water may be removed.

Also, with respect to the compound represented by Formula 2, an anion acts as a HF scavenger to remove HF or water while a fluorinated alkyl group of the anion is substituted by $F^-$ to form a new P—F bond, and simultaneously, an effect of increasing Li ions may be obtained.

As described above, in the present invention, since the non-aqueous electrolyte solution including the HF scavenger as an additive is provided, the above-described compounds may suppress the formation of LiF on the SEI of the negative electrode during initial charge, and thus, the output characteristics of the lithium secondary battery may be improved.

The non-aqueous electrolyte solution of the present invention may further include at least one second additive selected from the group consisting of compounds represented by the following Formulae 3 and 4, if necessary.

[Formula 3]

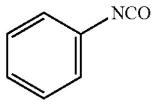

[Formula 4]

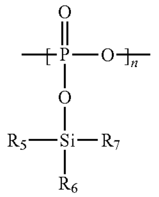

In Formula 4, $R_5$ to $R_7$ are each independently an alkyl group having 1 to 4 carbon atoms, n is an integer of 1 to 10.

In this case, the compound represented by Formula 4 may include a compound represented by Formula 4a below.

[Formula 4a]

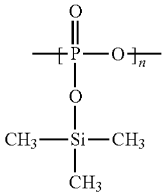

In Formula 4a, n is an integer of 1 to 3.

The second additive may be included in an amount of 0.1 wt % to 10 wt %, for example, 1 wt % to 7 wt % based on the total weight of the non-aqueous electrolyte solution. If the amount of the second additive is less than 0.1 wt %, a HF scavenger improvement effect is insignificant, and, in a case in which the amount of the second additive is greater than 10 wt %, the resistance may be increased by an excessive amount of the additive.

The compound represented by Formula 3 contains an isocyanate group as a functional group capable of removing HF in the structure, and the compound represented by Formula 4 contains a Si—O group as a functional group capable of removing HF in the structure. Thus, since an isocyanate bond of the compound represented by Formula 3 is deformed or a Si—O bond of the compound represented by Formula 4 breaks during high-temperature storage to be easily bonded to HF or water ($H_2O$) formed in the non-aqueous electrolyte solution, the HF or water may be removed.

In a case in which the isocyanate-based compound represented by Formula 3 is used alone, the isocyanate-based compound may reacts with a small amount of moisture in the battery or electrolyte solution to generate a primary amine and $CO_2$ that causes battery swelling, and a material, such as the amine, may react with $LiPF_6$ to intensify the generation of HF gas. Also, in a case in which the compound represented by Formula 4 is used alone, since phosphoric acid is formed during decomposition, cell performance may be degraded or the viscosity of the electrolyte solution may be increased. In order to prevent such disadvantages, it is more desirable to use the compound represented by Formula 3 or 4 in a mixture with the compound of Formula 1 or 2 than to use the compound represented by Formula 3 or 4 independently.

Thus, in a case in which the non-aqueous electrolyte solution including the HF scavenger of the present invention is used, since the above-described compounds may suppress the formation of LiF on the SEI of the negative electrode during initial charge, the output characteristics of the lithium secondary battery may be improved. Particularly, in a case in which the non-aqueous electrolyte solution of the present invention is included, effects of improving cycle life characteristics and high-temperature storage characteristics of the secondary battery may be achieved.

In the non-aqueous electrolyte solution for a lithium secondary battery of the present invention, any lithium salt typically used in an electrolyte solution for a lithium secondary battery may be used without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $ASF_6^-$, $BF_2C_2O_4^-$, $BC_4O_8^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^{-1}$, $CF_3(CF_2)_7SO_3^-$, $CF_3CO_2^-$, $CH_3CO_2^-$, $SCN^-$, and $(CF_3CF_2SO_2)_2N^-$ as an anion.

One or, if necessary, a mixture of two or more thereof may be used as the lithium salt. The lithium salt may be appropriately changed in a normally usable range, but may be included in a concentration of 0.8 M to 1.5 M in the electrolyte solution in order to obtain an optimum anti-corrosion film-forming effect on the surface of the electrode.

Also, in the non-aqueous electrolyte solution for a lithium secondary battery of the present invention, the carbonate compound included in the organic solvent may include both cyclic carbonate compound and linear carbonate compound.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, or a mixture of two or more thereof, and, among these materials, the cyclic carbonate compound may include ethylene carbonate which well dissociates the lithium salt in the electrolyte due to high permittivity as a highly viscous organic solvent.

Furthermore, specific examples of the linear carbonate compound having low viscosity and low permittivity may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Also, in order to prepare an electrolyte solution having high electrical conductivity, any organic solvent typically used in an electrolyte solution for a lithium secondary battery may be added and used as the organic solvent without limitation. For example, the organic solvent may further include a mixture of at least two selected from the group consisting of an ether compound and an ester compound.

As the ether compound, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound, any one selected from the group consisting of methyl acetate, ethyl acetate, propyl acetate, methyl propionate, ethyl propionate, propyl propionate, butyl propionate, and γ-butyrolactone, or a mixture of two or more thereof may be used, but the present invention is not limited thereto.

Also, in an embodiment of the present invention, provided is a lithium secondary battery including:

a positive electrode including a positive electrode active material, a negative electrode including a silicon-based negative electrode active material, a separator disposed between the positive electrode and the negative electrode, and the non-aqueous electrolyte solution of the present invention.

In the lithium secondary battery according to the embodiment of the present invention, the expression "silicon-based negative electrode active material" denotes a negative electrode active material including a silicon-based compound.

The silicon-based compound is a material which may be doped and undoped with lithium, wherein, as a compound including at least about 50 wt % or more, for example, about 70 wt % or more of silicon (Si) in the silicon-based compound, typical examples of the silicon-based compound may include materials selected from the group consisting of Si, $SiO_x$ (0<x<2), a Si—Z alloy (where Z includes alkali metal, alkaline earth metal, a Group 13 element, a Group 14 element, a Group 15 element, a Group 16 element, transition metal, a rare earth element, or a combination thereof, and is not Si), and a combination thereof. The element Z may be selected from the group consisting of magnesium (Mg), calcium (Ca), strontium (Sr), barium (Ba), radium (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), germanium (Ge), phosphorus (P), arsenic (As), antimony (Sb), bismuth (Bi), sulfur (S), selenium (Se), tellurium (Te), polonium (Po), and a combination thereof. Also, the silicon-based negative electrode active material, such as Si, $SiO_x$, and the Si—Z alloy, may be substantially crystalline (single crystal and polycrystals are included), amorphous, or a mixed form thereof.

The silicon-based compound may have a nanostructure having an average particle diameter (D50) of less than about 500 nm, for example, less than about 200 nm, less than about 100 nm, less than about 50 nm, or less than about 20 nm. Examples of the nanostructure may be nanoparticles, nanopowder, nanowires, nanorods, nanofibers, nanocrystals, nanodots, and nanoribbons.

The silicon-based negative electrode active material may be used alone or in a combination of two or more thereof.

Furthermore, the negative electrode may further include a carbon-based negative electrode active material with the silicon-based compound, if necessary.

The carbon-based negative electrode active material may include a single material selected from the group consisting of natural graphite, artificial graphite, graphite, graphitizable carbon (soft carbon), non-graphitizable carbon (hard carbon), carbon black, and graphite oxide, or a mixture of two or more thereof, but may specifically include artificial graphite or natural graphite.

An average particle diameter of the carbon-based negative electrode active material is not particularly limited, but, in a case in which the average particle diameter is excessively small, cycle characteristics may be reduced due to high reactivity with the electrolyte solution, and, in a case in which the average particle diameter is excessively large, dispersion stability is reduced during the preparation of a negative electrode slurry and the surface of the negative electrode becomes rough. Thus, the average particle diameter (D50) of the carbon-based negative electrode active material may be in a range of 5 μm to 30 μm, for example, 10 μm to 20 μm.

Also, the carbon-based negative electrode active material may have a spherical shape with a partially bent or curved appearance or a polygonal shape, such as an approximately spherical shape although not perfectly spherical or an oval shape, and may have an uneven surface.

In the secondary battery of the present invention, in a case in which the silicon-based compound and the carbon-based negative electrode active material are mixed in the negative electrode, the silicon-based compound and the carbon-based negative electrode active material may be included at a weight ratio of 2:98 to 100:0.

Furthermore, the negative electrode may further include a binder and a conductive agent in addition to the negative electrode active material.

The negative electrode may be prepared by coating a negative electrode collector with a negative electrode active material slurry including the negative electrode active material, binder, conductive agent, and solvent, and then drying and rolling the coated negative electrode collector.

The negative electrode active material may be included in an amount of 80 wt % to 99 wt % based on a total weight of the negative electrode active material slurry.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to a positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The binder is a component that assists in the binding between the conductive agent, the active material, and the current collector, wherein the binder may be included in an amount of 1 wt % to 30 wt % based on the total weight of the negative electrode active material slurry.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the negative electrode active material slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent is a component that may be removed during drying, wherein it may include water or an organic solvent, such as N-methyl-2-pyrrolidone (NMP), and may be used in an amount such that desirable viscosity is obtained when the negative electrode active material as well as selectively the binder and the conductive agent are included. For example, the solvent may be included in an amount such that a concentration of a solid content including the negative electrode active material as well as selectively the binder and the conductive agent is in a range of 50 wt % to 95 wt %, for example, 70 wt % to 90 wt %.

Also, in the lithium secondary battery of the present invention, the positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_{Y2}O_2$ (where $0<Y2<1$), $LiMn_{2-Z1}O_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{z1}O_4$ (where $0<Z1<2$) etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), Fe, V, Cr, Ti, Ta, Mg, and Mo, and p2, q2, r3, and s2 are atomic fractions of each independent elements, wherein $0<p2<1$, $0<q2<1$, $0<r3<1$, $O<S2<1$, and $p2+q2+r3+S2=1$), etc.), and any one thereof or a compound of two or more thereof may be included. Among these materials, in terms of the improvement of capacity characteristics and stability of the battery, the lithium composite metal oxide may include $LiCoO_2$, $LiMnO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$) or lithium nickel cobalt aluminum oxide (e.g., $Li(Ni_{0.8}Co_{0.15}Al_{0.05})O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt % based on a total weight of solid content in the positive electrode slurry.

In a case in which the amount of the positive electrode active material is 80 wt % or less, since energy density is decreased, capacity may be reduced.

Also, the binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Furthermore, the conductive agent is a material providing conductivity while not causing chemical changes in the battery, wherein the conductive agent may be added in an amount of 1 wt % to 20 wt % based on the total weight of the solid content in the positive electrode slurry.

As typical examples of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used, and those currently sold under the names, such as acetylene black-based conductive agents (Chevron Chemical Company, Denka black (Denka Singapore Private Limited), or Gulf Oil Company), Ketjen black, ethylene carbonate (EC)-based conductive agents (Armak Company), Vulcan XC-72 (Cabot Company), and Super P (Timcal Graphite & Carbon), may be used.

Also, the solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

The lithium secondary battery of the present invention may further include a separator.

Specifically, the lithium secondary battery of the present invention may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution of the present invention was prepared by adding 5 g of fluoroethylene carbonate (FEC) and 1 g of the compound represented by Formula 1a to 94 g of a non-aqueous organic solvent (ethylene carbonate (EC):diethyl carbonate (DEC)=volume ratio of 3:7) in which 1 M $LiPF_6$ was dissolved (see Table 1 below).

The organic mixed solution and the additive of the present invention were added as listed in the following Table 1 to prepare a non-aqueous electrolyte solution.

(Secondary Battery Preparation)

Lithium cobalt composite oxide ($LiCoO_2$) as positive electrode active material particles, carbon black as a conductive agent, and polyvinylidene fluoride, as a binder, were added at a ratio of 90:5:5 (wt %) to N-methyl-2-pyrrolidone (NMP), as a solvent, to prepare a positive electrode slurry (solid content of 40%). A 100 μm thick positive electrode collector (Al thin film) was coated with the positive electrode slurry, dried, and roll-pressed to prepare a positive electrode.

$SiO_x$ (0<x<1) and natural graphite (average particle diameter (D50) of 10 μm) as a negative electrode active material, polyvinylidene fluoride as a binder, and carbon black, as a conductive agent, were added at a ratio of 10:85:2:3 (wt %) to NMP, as a solvent, to prepare a negative electrode slurry (solid content of 90%). A 90 μm thick negative electrode collector (Cu thin film) was coated with the negative electrode slurry, dried, and roll-pressed to prepare a negative electrode.

After an electrode assembly was prepared by stacking a polyethylene porous film with the positive electrode and negative electrode prepared by the above-described methods, the electrode assembly was put in a battery case, the non-aqueous electrolyte solution thus prepared was injected thereinto, and the battery case was sealed to prepare a lithium secondary battery.

Example 2

A non-aqueous electrolyte solution and a lithium secondary battery including the same were prepared in the same manner as in Example 1 except that the compound of Formula 2a, instead of the compound of Formula 1a, was included during the preparation of the non-aqueous electrolyte solution.

Example 3

A non-aqueous electrolyte solution and a lithium secondary battery including the same were prepared in the same manner as in Example 1 except that the compound of Formula 2b, instead of the compound of Formula 1a, was included during the preparation of the non-aqueous electrolyte solution.

Example 4

A non-aqueous electrolyte solution and a battery including the same were prepared in the same manner as in Example 1 except that 0.5 g of the compound of Formula 1a and 0.5 g of the compound of Formula 2a, instead of the compound of Formula 1a, were included during the preparation of the non-aqueous electrolyte solution.

Example 5

A non-aqueous electrolyte solution and a lithium secondary battery including the same were prepared in the same manner as in Example 1 except that 10 g of fluoroethylene carbonate (FEC) and 10 g of the compound represented by Formula 1a were included in 80 g of the non-aqueous organic solvent during the preparation of the non-aqueous electrolyte solution.

Example 6

A non-aqueous electrolyte solution and a lithium secondary battery including the same were prepared in the same manner as in Example 1 except that 0.1 g of fluoroethylene carbonate (FEC) and 0.1 g of the compound represented by Formula 1a were included in 98.8 g of the non-aqueous organic solvent during the preparation of the non-aqueous electrolyte solution.

Comparative Example 1

A non-aqueous electrolyte solution and a lithium secondary battery including the same were prepared in the same manner as in Example 1 except that both of the fluoroethylene carbonate (FEC) and the compound of Formula 1a were not added during the preparation of the non-aqueous electrolyte solution.

Comparative Example 2

A non-aqueous electrolyte solution and a lithium secondary battery including the same were prepared in the same manner as in Example 1 except that 5 g of fluoroethylene carbonate (FEC) was included in 95 g of the non-aqueous organic solvent during the preparation of the non-aqueous electrolyte solution.

EXPERIMENTAL EXAMPLES

Experimental Example 1. Cycle Life Characteristics Evaluation

Each of the batteries prepared in Examples 1 to 6 and Comparative Examples 1 and 2 was charged at a 0.1 C rate to 4.35 V under a constant current/constant voltage condition, cut-off charged at 0.05 C, and discharged at 0.1 C to a voltage of 3.0 V. Subsequently, each battery was charged at a 0.8 C rate to 4.35 V under a constant current/constant voltage condition, cut-off charged at 0.05 C, and discharged at 0.5 C to a voltage of 3.0 V (initial discharge capacity).

After each battery was charged and discharged 200 times under the same conditions, discharge capacity in each cycle was expressed as a percentage (%) relative to the initial discharge capacity, and the results thereof are presented in the following FIG. 1.

As illustrated in FIG. 1, with respect to the secondary batteries of Examples 1 to 6 which respectively included the non-aqueous electrolyte solutions of the present invention, it may be confirmed that cycle life characteristics were slowly reduced, but cycle life characteristics of the secondary batteries of Comparative Examples 1 and 2 were rapidly reduced after 100 cycles of charge and discharge.

Particularly, with respect to the secondary battery of Example 4 in which the compounds represented by Formulae 1 and 2 were mixed and used as the additive component of the non-aqueous electrolyte solution, it may be understood that the cycle life characteristics were more improved than those of the secondary batteries of Examples 1 to 3 and 5 which respectively included the non-aqueous electrolyte solutions each including the compound represented by Formula 1 or 2 alone.

Experimental Example 2. High-Temperature Storage Performance Measurement

Each of the batteries prepared in Examples 1 to 6 and Comparative Examples 1 and 3 was charged at a 0.1 C rate to 4.35 V under a constant current/constant voltage condition, cut-off charged at 0.05 C, and discharged at 0.1 C to a voltage of 3.0 V. Subsequently, each battery was charged at a 0.8 C rate to 4.35 V under a constant current/constant voltage condition, cut-off charged at 0.05 C, and discharged at 0.5 C to a voltage of 3.0 V (initial discharge capacity).

Again, each battery was charged at a 0.8 C rate to 4.35 V under a constant current/constant voltage condition, cut-off charged at 0.05 C, and stored at 60° C. for 2 weeks. Thereafter, each battery was discharged at 0.5 C to a voltage of 3.0 V at room temperature and discharge capacity was measured (residual discharge capacity).

Again, each battery was charged at a 0.8 C rate to 4.35 V under a constant current/constant voltage condition, cut-off charged at 0.05 C, and discharged at 0.5 C to a voltage of 3.0 V to measure discharge capacity (recovery discharge capacity).

The measured recovery discharge capacity was expressed as a percentage (%) relative to the initial discharge capacity, and the results thereof are presented in the following Table 1.

TABLE 1

| | Non-aqueous electrolyte solution | | | | | | |
|---|---|---|---|---|---|---|---|
| | Non-aqueous organic solvent | | Additive | | | | |
| | | | Amount | HF scavenger | | | |
| | Type (volume ratio) | Amount added (g) | of FEC added (g) | Formula | Amount added (g) | Residual discharge capacity | Recovery discharge capacity |
| Example 1 | EC:DEC = 3:7 | 94 | 5 | 1a | 1 | 84 | 94 |
| Example 2 | EC:DEC = 3:7 | 94 | 5 | 2a | 1 | 85 | 94 |
| Example 3 | EC:DEC = 3:7 | 94 | 5 | 2b | 1 | 84 | 93 |
| Example 4 | EC:DEC = 3:7 | 94 | 5 | 1a | 0.5 | 87 | 96 |
| | | | | 2a | 0.5 | | |
| Example 5 | EC:DEC = 3:7 | 80 | 10 | 1a | 10 | 83 | 91 |
| Example 6 | EC:DEC = 3:7 | 99.8 | 0.1 | 1a | 0.1 | 82 | 90 |
| Comparative Example 1 | EC:DEC = 3:7 | 100 | 0 | 0 | 0 | 66 | 85 |
| Comparative Example 2 | EC:DEC = 3:7 | 95 | 5 | 0 | 0 | 72 | 83 |

As illustrated in Table 1, with respect to the secondary batteries of Examples 1 to 6 which respectively included the non-aqueous electrolyte solutions of the present invention, it may be understood that residual discharge capacities and recovery discharge capacities were better than those of the secondary battery of Comparative Example 1, which included the non-aqueous electrolyte solution without the fluoroethylene carbonate and the HF scavenger, and the secondary battery of Comparative Example 2 which included the non-aqueous electrolyte solution only including the fluoroethylene carbonate.

Particularly, with respect to the secondary battery of Example 4 in which the compounds represented by Formulae 1 and 2 were mixed and used as the additive component of the non-aqueous electrolyte solution, it may be understood that both of the residual discharge capacity and the recovery discharge capacity were better than those of the secondary batteries of Examples 1 to 3 and 5 which respectively included the non-aqueous electrolyte solutions each including the compound represented by Formula 1 or 2 alone.

The invention claimed is:

1. A lithium secondary battery comprising:

a positive electrode including a positive electrode active material, a negative electrode including a silicon oxide-based negative electrode active material, a separator disposed between the positive electrode and the negative electrode, and a non-aqueous electrolyte solution, wherein the non-aqueous electrolyte solution consists of:

a lithium salt having $Li^+$ as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $ASF_6^-$, $BF_2C_2O_4^-$, $BC_4O_8^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^{-1}$, $CF_3(CF_2)_7SO_3^-$, $CF_3CO_2^-$, $CH_3CO_2^-$, $SCN^-$, and $(CF_3CF_2SO_2)_2N^-$ as an anion, a first organic solvent selected from a cyclic carbonate compound, a linear carbonate compound, an ether compound or an ester compound, wherein the ester compound is selected from the group consisting of methyl acetate, ethyl acetate, propyl acetate, methyl propionate, ethyl propionate, propyl propionate, butyl propionate, and y-butyrolactone, or a mixture thereof, fluoroethylene carbonate, and a compound represented by Formula 1e and at least one compound selected from a compound represented by Formula 2 as a first additive, and at least one compound selected from the group consisting of compounds represented by the Formulae 3 and 4 as a second additive:

[Formula 1e]

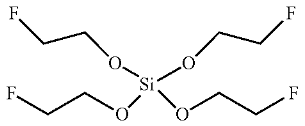

[Formula 2]

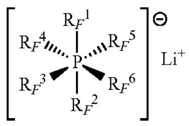

wherein, in Formula 2, $R_F^1$ and $R_F^2$ are each independently a fluorine-substituted or unsubstituted alkyl group having 1 to 3 carbon atoms, and $R_F^3$ to $R_F^6$ are each independently a fluorine atom,

[Formula 3]

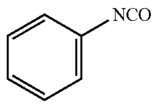

[Formula 4]

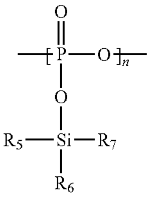

wherein, in Formula 4, $R_5$ to $R_7$ are each independently an alkyl group having 1 to 4 carbon atoms, and n is an integer of 1 to 10, wherein the fluoroethylene carbonate is included in an amount of 0.1 wt % to 40 wt % based on a total weight of the non-aqueous electrolyte solution, and the first additive is included in an amount of 0.1 wt % to 10 wt % based on a total weight of the non-aqueous electrolyte solution.

2. The lithium secondary battery of claim 1, wherein the negative electrode active material further comprises a carbon-based negative electrode active material.

3. The lithium secondary battery of claim 1, wherein the fluoroethylene carbonate is included in an amount of 0.1 wt % to 30 wt % based on a total weight of the non-aqueous electrolyte solution.

4. The lithium secondary battery of claim 1, wherein the fluoroethylene carbonate is included in an amount of 5 wt % to 20 wt % based on a total weight of the non-aqueous electrolyte solution.

5. The lithium secondary battery of claim 1, wherein the compound represented by Formula 2 comprises a compound represented by Formula 2b:

[Formula 2b]

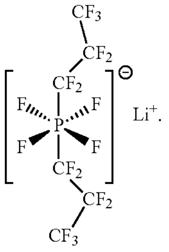

6. The lithium secondary battery of claim 1, wherein the first additive is included in an amount of 1 wt % to 10 wt % based on a total weight of the non-aqueous electrolyte solution.

7. A non-aqueous electrolyte solution consisting of:

a lithium salt having $Li^+$ as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $ASF_6^-$, $BF_2C_2O_4^-$, $BC_4O_8^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^{-1}$, $CF_3(CF_2)_7SO_3^-$, $CF_3CO_2^-$, $CH_3CO_2^-$, $SCN^-$, and $(CF_3CF_2SO_2)_2N^-$ as an anion, a first organic solvent selected from a cyclic carbonate compound, a linear carbonate compound, an ether compound or an ester compound, wherein the ester compound is selected from the group consisting of methyl acetate, ethyl acetate, propyl acetate, methyl propionate, ethyl propionate, propyl propionate, butyl propionate, and γ-butyrolactone, or a mixture thereof, fluoroethylene carbonate, and a compound represented by Formula 1e and at least one compound selected from a compound represented by Formula 2 as a first additive, and at least one compound selected from the group consisting of compounds represented by the following Formulae 3 and 4 as a second additive:

[Formula 1e]

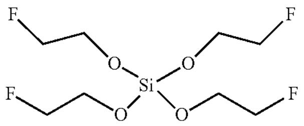

[Formula 2]

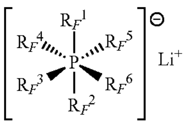

wherein, in Formula 2, $R_F^1$ and $R_F^2$ are each independently a fluorine-substituted or unsubstituted alkyl group having 1 to 3 carbon atoms, and $R_F^3$ to $R_F^6$ are each independently a fluorine atom,

[Formula 3]

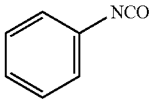

[Formula 4]

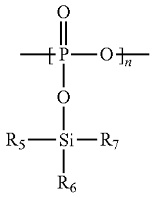

wherein, in Formula 4, $R_5$ to $R_7$ are each independently an alkyl group having 1 to 4 carbon atoms, and n is an integer of 1 to 10, wherein the fluoroethylene carbonate is included in an amount of 0.1 wt % to 40 wt % based on a total weight of the non-aqueous electrolyte solution, and the first additive is included in an amount of 0.1 wt % to 10 wt % based on a total weight of the non-aqueous electrolyte solution.

8. The non-aqueous electrolyte solution of claim 7, wherein the fluoroethylene carbonate is included in an amount of 0.1 wt % to 30 wt % based on a total weight of the non-aqueous electrolyte solution.

9. The non-aqueous electrolyte solution of claim 7, wherein the fluoroethylene carbonate is included in an amount of 5 wt % to 20 wt % based on a total weight of the non-aqueous electrolyte solution.

10. The non-aqueous electrolyte solution of claim 7, wherein the compound represented by Formula 2 comprises a compound represented by Formula 2b:

[Formula 2b]

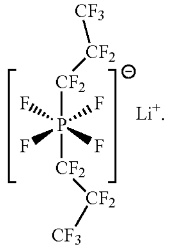

11. The non-aqueous electrolyte solution of claim 7, wherein the first additive is included in an amount of 1 wt % to 10 wt % based on a total weight of the non-aqueous electrolyte solution.

* * * * *